(12) United States Patent
Matsumoto et al.

(10) Patent No.: US 9,367,567 B2
(45) Date of Patent: Jun. 14, 2016

(54) FEATURE VALUE EXTRACTION APPARATUS AND FEATURE VALUE EXTRACTION METHOD

(75) Inventors: Yuichi Matsumoto, Kanagawa (JP); Cher Keng Heng, Singapore (SG)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 172 days.

(21) Appl. No.: 14/235,178

(22) PCT Filed: Jul. 25, 2012

(86) PCT No.: PCT/JP2012/069532
§ 371 (c)(1),
(2), (4) Date: Jan. 27, 2014

(87) PCT Pub. No.: WO2013/018816
PCT Pub. Date: Feb. 7, 2013

(65) Prior Publication Data
US 2014/0164413 A1   Jun. 12, 2014

(30) Foreign Application Priority Data
Jul. 29, 2011   (JP) .................................. 2011-167232

(51) Int. Cl.
*G06F 17/30*   (2006.01)
*G06K 9/46*   (2006.01)

(52) U.S. Cl.
CPC .... *G06F 17/30247* (2013.01); *G06F 17/30256* (2013.01); *G06K 9/4642* (2013.01); *G06K 9/4647* (2013.01)

(58) Field of Classification Search
CPC ..................... G06F 17/30247; G06F 17/30256
USPC .......................................................... 707/756
See application file for complete search history.

(56) References Cited

U.S. PATENT DOCUMENTS

| 7,627,166 B2 | 12/2009 | Shah |
| 8,233,720 B2 | 7/2012 | Waragai et al. |

(Continued)

FOREIGN PATENT DOCUMENTS

| EP | 1 892 669 | 2/2008 |
| JP | 2006-350645 | 12/2006 |

(Continued)

OTHER PUBLICATIONS

Jiří Trefný et al., "Extended Set of Local Binary Patterns for Rapid Object Detection", Czech Pattern Recognition Society, Computer Vision Winter Workshop 2010, pp. 1-7.

(Continued)

*Primary Examiner* — Joshua Bullock
(74) *Attorney, Agent, or Firm* — Greenblum & Bernstein, P.L.C.

(57) ABSTRACT

A feature value extraction apparatus is provided that includes an image input unit that receives an input of an image, and a converted image generation unit that converts the input image into at least one converted image for extracting a feature value of the input image. The apparatus also includes a feature value generation pattern holding unit that stores a feature value generation pattern that includes a plurality of comparison pairs of unit positions for comparing unit values in a unit array in which units, each of which includes at least one pixel, are arranged. The apparatus further includes a feature value extraction unit that compares the unit values corresponding to the comparison pairs through referring to the feature value generation pattern with respect to the converted image, and extracts the feature value of the converted image.

8 Claims, 10 Drawing Sheets

(56) References Cited

U.S. PATENT DOCUMENTS

| | | | |
|---|---|---|---|
| 2007/0076950 A1* | 4/2007 | Shah | G06K 9/00456 |
| | | | 382/170 |
| 2009/0232403 A1* | 9/2009 | Waragai | G06K 9/00228 |
| | | | 382/209 |
| 2012/0189193 A1* | 7/2012 | Overett | G06K 9/4609 |
| | | | 382/159 |

FOREIGN PATENT DOCUMENTS

| WO | 2006/090313 | 8/2006 |
|---|---|---|
| WO | 2010/138988 | 12/2010 |

OTHER PUBLICATIONS

Baochang Zhang et al., "Local Derivative Pattern Versus Local Binary Pattern: Face Recognition With High-Order Local Pattern Descriptor", IEEE Transactions on Image Processing, vol. 19, No. 2, Feb. 2010, pp. 533-544.

Topi Mäenpää, "The Local Binary Pattern Approach to Texture Analysis—Extensions and Applications", Oulu University Press, 2003.

International Search Report, mailed Jan. 30, 2013, in corresponding International Application No. PCT/JP2012/069532.

* cited by examiner

FIG.5
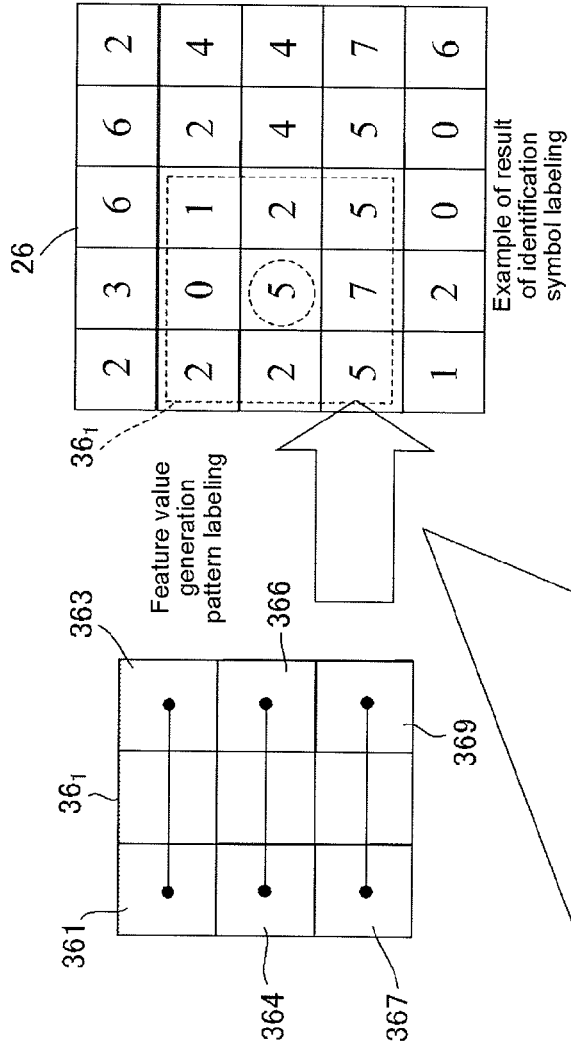
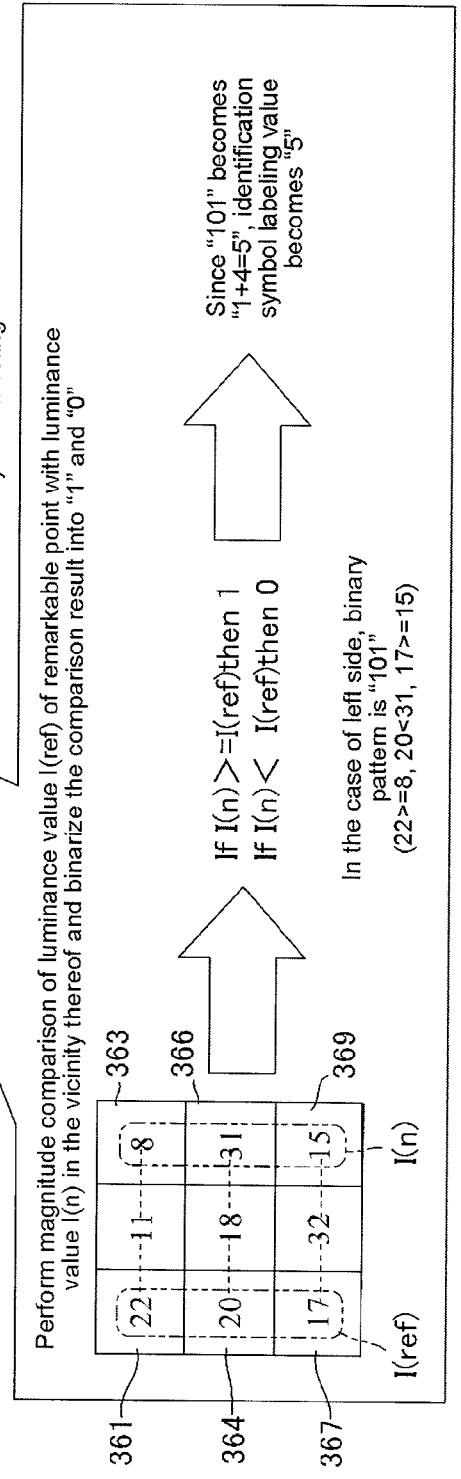

FEATURE VALUE EXTRACTION APPARATUS AND FEATURE VALUE EXTRACTION METHOD

TECHNICAL FIELD

The present invention relates to a feature value extraction apparatus and a feature value extraction method, which can extract a feature value for detecting a person or a general object, such as a vehicle or a motorcycle, from an input image.

BACKGROUND ART

A device has been devised which extracts a feature value from a converted image that is obtained by performing image conversion of an input image and detects an object using a statistical learning method, such as SVM (Support Vector Machine) or Boosting. Feature values, for example, may be those described in Patent Literature 1, Non-Patent Literature 1, and Non-Patent Literature 2. The feature value described in Non-Patent Literature 1 is called an LBP (Local Binary Patterns) feature value, and the feature value described in Non-Patent Literature 2 is an improvement of the LBP feature value described in Non-Patent Literature 1, and is called an extended set of local binary patterns.

CITATION LIST

Patent Literature

Patent Literature 1: JP-A-2006-350645

Non-Patent Literatures

Non-Patent Literature 1: The Local Binary Pattern Approach to Texture Analysis-Extensions and Applications, Oulu University, 2003

Non-Patent Literature 2: Jirí Trefný and Jirí Matas, Extended Set of Local Binary Patterns for Rapid Object Detection, Computer Vision Winter Workshop 2010

SUMMARY OF INVENTION

Technical Problem

However, with respect to the feature values disclosed in the above-described Non-Patent Literatures 1 and 2 and Patent Literature 1, there are problems as described below.

(1) The feature value described in Non-Patent Literature 1 is a local feature value for making a magnitude comparison between pairs of pixel values. This feature value is susceptive to noise, and has insufficient comprehensive information. For example, if there is any one pair, of which the magnitude relation is different due to the noise, among the pairs of the pixel values between which the magnitude comparison has been made, the obtained feature value becomes something completely different.

(2) The feature value described in Patent Literature 1 is a local feature value for making a magnitude comparison between average pixel values in areas. This feature value compensates for the lack of the comprehensive information of the feature value described in Non-Patent Literature 1, but also tends to be too comprehensive.

(3) As a problem common to the feature values described in Non-Patent Literature 1 and Patent Literature 1, some degree of detection accuracy can be obtained in detecting a face of a person using these features, but sufficient detection accuracy cannot be obtained in detecting a person or a general object, such as a vehicle or a motorcycle, which is generally considered to have a higher degree of detection difficulty than the face detection. For example, in the case of detecting a face of a person, the positions of parts of the face, such as an eye, a nose, and a mouth, which are features of the face, are determined to some extent independently of the person, and thus there is almost no variation of the positions of the components by individual differences in persons.

Accordingly, by expressing the feature for every part position of the face using the feature values described in Non-Patent Literature 1 and Patent Literature 1, stable face detection accuracy can be obtained. On the other hand, the appearance of a person or a general object such as a vehicle or a motorcycle differs greatly depending on the shape or posture thereof, and thus it can be said that its variation is large in comparison to the variation of the face of the person. According to the feature values described in Non-Patent Literature 1 and Patent Literature 1, such individual variation cannot be absorbed, and thus the detection accuracy becomes deteriorated.

(4) According to the feature value described in Non-Patent Literature 2, by increasing the number of patterns for making a magnitude comparison between the pairs of the pixel values and performing frequency distribution of the result of magnitude comparison between the pixel values for each local area in an input image, the improvement of detection accuracy and the absorption of variation of the shape or posture of an object have been sought. However, simple increase in the number of patterns for making the magnitude comparison between the pairs of the pixel values leads to an increase in the amount of processing and memory usage.

Accordingly, the present invention has been made in consideration of the above-described situations, and the an object of the present invention is to provide a feature value extraction apparatus and a feature value extraction method, which can detect a person or a general object, such as a vehicle or a motorcycle, with high accuracy, and keep a small amount of processing and memory usage through feature value extraction.

Solution to Problem

An aspect of the present invention provides a feature value extraction apparatus, including: an image input unit that receives an input of an image; a converted image generation unit that converts the input image into at least one converted image for extracting a feature value of the input image; a feature value generation pattern holding unit that stores a feature value generation pattern that includes a plurality of comparison pairs of unit positions for comparing unit values in a unit array in which units, each of which includes at least one pixel, are arranged; and a feature value extraction unit that compares the unit values corresponding to the comparison pairs through referring to the feature value generation pattern with respect to the converted image, and extracts the feature value of the converted image.

According to the above-described configuration, since more suitable feature value generation pattern is used depending on the respective characteristics of the converted image, it is possible to obtain the feature value whereby the person or the general object, such as the vehicle or the motor cycle, can be detected with high accuracy.

The feature value extraction apparatus may be configured so that the unit values are obtained from luminance values of the pixels of the units.

According to the above-described configuration, by obtaining the unit value from the luminance value of the pixel of the unit or the average value of the luminance values of the pixels included in the unit, the noise component can be smoothed.

The feature value extraction apparatus may be configured so that the plurality of comparison pairs constituting the feature value generation pattern are distinguished by predetermined identification symbols for each of the comparison pairs, and the feature value extraction unit refers to the feature value generation patterns multiple times while changing a reference position of the feature value generation pattern for the converted image, and extracts the feature value of the converted image by frequency distributions of the predetermined identification symbols.

According to the above-described configuration, it is possible to obtain the feature value whereby the person or the general object, such as the vehicle or the motor cycle, can be detected with high accuracy.

The feature value extraction apparatus may be configured so that the converted image is divided into a plurality of local areas, and the feature value extraction unit obtains the feature value of the converted image from the frequency distribution obtained for each of the local areas.

According to the above-described configuration, by dividing the converted image into local areas and preparing the frequency distribution that is obtained for each local area, the absorption of the variation of the shape or posture of the general object can be sought, and thus it is possible to obtain the feature value whereby the person or the general object, such as the vehicle or the motor cycle, can be detected with high accuracy.

The feature value extraction apparatus may be configured so that each of a plurality of converted images is divided into a plurality of local areas, and the feature value extraction unit obtains an aggregate feature value by collecting, for each of the converted images, the frequency distributions obtained for each of the local areas, and obtains the feature value of the input image from the aggregate feature value for the converted images.

According to the above-described configuration, it is possible to obtain the feature value whereby the person or the general object, such as the vehicle or the motor cycle, can be detected with high accuracy.

The feature value extraction apparatus may be configured so that the converted image generation unit converts the input image into a plurality of converted images, the feature value generation pattern holding unit stores feature value generation patterns according to the characteristics of the plurality of converted images, and the feature value extraction unit refers to the feature value generation pattern depending on the characteristic of each of the converted images, and extracts feature values of the plurality of converted images.

According to the above-described configuration, since more suitable feature value generation pattern is used depending on the respective characteristics of the converted image, it is possible to obtain the feature value whereby the person or the general object, such as the vehicle or the motor cycle, can be detected with high accuracy.

An aspect of the present invention provides an image determination apparatus, including: a feature value holding unit that holds a feature value that an object to be determined for determining an image has; and the feature value extraction apparatus, wherein the image determination apparatus determines whether the object to be determined is included in the input image.

According to the above-described configuration, it is possible to obtain the feature value whereby the person or the general object, such as the vehicle or the motor cycle, can be detected with high accuracy.

An aspect of the present invention provides a feature value extraction method, including: receiving an input of an image; converting the input image into at least one converted image for extracting a feature value of the input image; storing a feature value generation pattern that includes a plurality of comparison pairs of unit positions for comparing unit values in a unit array in which units, each of which includes at least one pixel, are arranged; and comparing the unit values corresponding to the comparison pairs through referring to the feature value generation pattern with respect to the converted image, and extracting the feature value of the converted image.

According to the above-described method, since more suitable feature value generation pattern is used depending on the respective characteristics of the converted images, it is possible to obtain the feature value whereby the person or the general object, such as the vehicle or the motor cycle, can be detected with high accuracy.

An aspect of the present invention provides an image determination method, including: holding a feature value that an object to be determined for determining an image has; and determining whether the object to be determined is included in the input image by using the feature value extraction method.

According to the above-described method, it is possible to obtain the feature value whereby the person or the general object, such as the vehicle or the motor cycle, can be detected with high accuracy.

Advantageous Effects of Invention

According to the present invention, it is possible to detect the general object, such as the person, the vehicle or the motorcycle, with high accuracy, and in the above-described detection process, it becomes possible to keep a small amount of processing and memory usage.

BRIEF DESCRIPTION OF DRAWINGS

FIG. 5 is a diagram illustrating a method of calculating identification symbol labeling values in the feature value extraction apparatus of FIG. 1.

DESCRIPTION OF EMBODIMENTS

Hereinafter, exemplary embodiments of the present invention will be described in detail with reference to the drawings.

Figure 1:
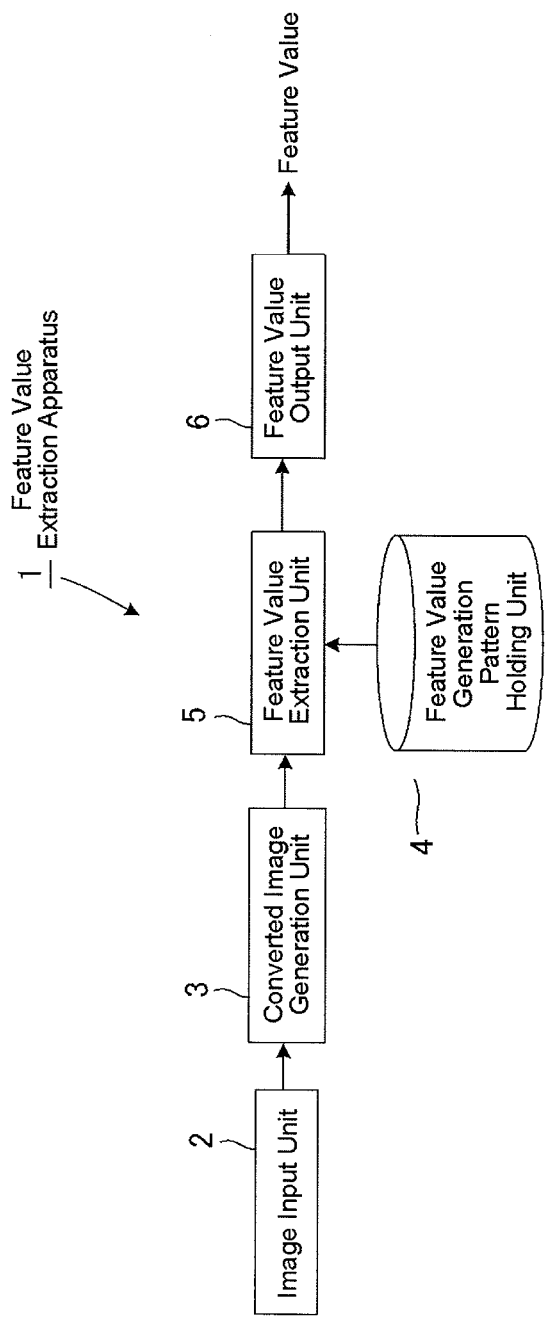
FIG. 1 is a block diagram illustrating the schematic configuration of a feature value extraction apparatus according to an embodiment of the present invention.

FIG. 1 is a block diagram illustrating the schematic configuration of a feature value extraction apparatus 1 according to an embodiment of the present invention. In FIG. 1, the feature value extraction apparatus 1 according to the embodiment of the present invention includes an image input unit 2, a converted image generation unit 3, a feature value generation pattern holding unit 4, a feature value extraction unit 5, and a feature value output unit 6. The image input unit 2 receives an input of an image. To the image input unit 2, an image obtained by photographing a person and an image obtained by photographing a general object, such as a vehicle or a motorcycle, are given. The converted image generation unit 3 generates a plurality of converted images from the image input through the image input unit 2. That is, the converted image generation unit 3 converts the image input through the image input unit 2 into at least one converted image for extracting the feature value of the image. The converted images may include a grayscale image, a Gaussian filter image, and a gradient image for each direction.

The feature value generation pattern holding unit 4 holds feature value generation patterns according to the characteristics of the converted images. As described in detail later, the feature value generation pattern holding unit 4 stores the feature value generation patterns that include comparison pairs of unit positions for comparing unit values in a unit array in which units, each of which includes at least one pixel, are arranged. For example, in the case of the grayscale image, like a typical LBP, the feature value generation pattern that describes the magnitude relation between luminance values of a predetermined reference pixel and neighboring pixels surrounding the reference pixel is described. In the case of the Gaussian filter image, high-frequency components that become noises have already been removed in many cases in the process of generating the converted images, and thus it may store the feature value generation pattern for grasping the local features. Further, in the gradient image for each direction, only the feature value generation pattern in which an edge for each direction is seen is stored.

The feature value extraction unit 5 extracts identification symbols for designated feature value generation patterns with respect to the converted images, and performs frequency distribution of the number of identification symbols in the local area. When extracting the identification symbols, the feature value extraction unit 5 compares the unit values corresponding to the comparison pairs through referring to the feature value generation pattern with respect to the converted images from the feature value generation pattern holding unit 4, and extracts the identification symbols of the converted images from the result of the comparison. The feature value output unit 6 aggregates the frequency distribution of the identification symbols obtained from the respective converted images, and outputs the aggregated frequency distribution as the feature value of the input image.

Figure 2:
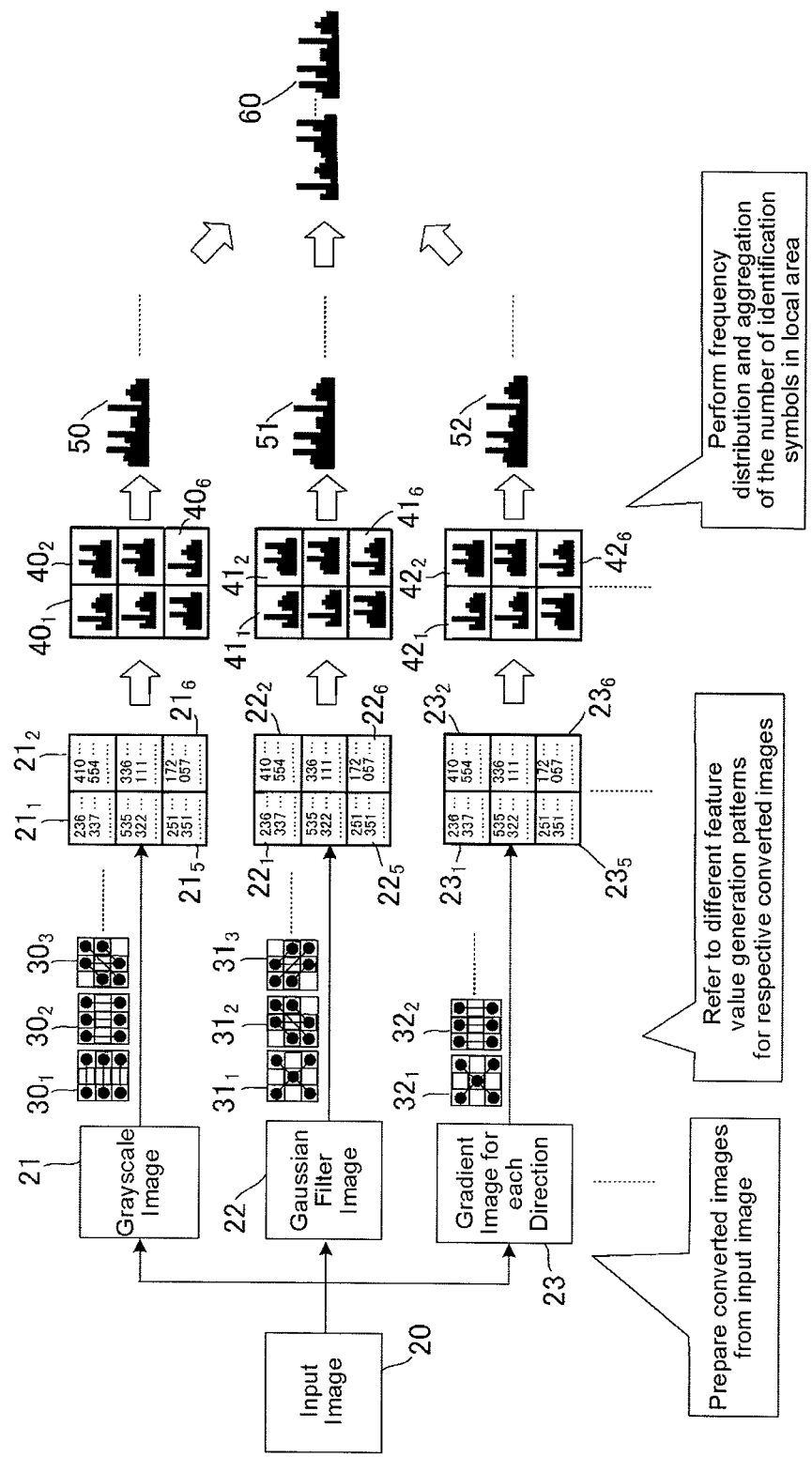
FIG. 2 is a diagram schematically illustrating the overview of processes performed by the feature value extraction apparatus of FIG. 1.

FIG. 2 is a diagram schematically illustrating the overview of processes performed by the feature value extraction apparatus of FIG. 1. In FIG. 2, the input image 20 is converted into the grayscale image 21, the Gaussian filter image 22, and the gradient image 23 for each direction. That is, the grayscale image 21, the Gaussian filter image 22, and the gradient image 23 for each direction are generated from the input image 20. After the converted images are generated, different feature value generation patterns $30_1, 30_2, 30_3, \ldots, 31_1, 31_2, 31_3, \ldots, 32_1, 32_2, \ldots$ are referred to for the converted images. Then, (1) local areas $21_1, 21_2, 21_3, \ldots, 21_6, 22_1, 22_2, 22_3, \ldots, 22_6, 23_1, 23_2, 23_3, \ldots, 23_6$ for the converted images are set with respect to the converted images (that is, each converted image is divided into local areas). Then, (2) the number of identification symbols is expressed as identification symbol frequency distributions $40_1, 40_2, \ldots, 40_6, 41_1, 41_2, \ldots, 41_6, 42_1, 42_2, \ldots, 42_6$ by using any one of the feature value generation patterns in the respective local areas for the converted images. (3) The processes of (1) and (2) are repeatedly performed as many as the number of feature value generation patterns while changing the feature value generation patterns.

For example, in the case of the grayscale image 21, after the local areas $21_1, 21_2, 21_3, \ldots, 21_6$ are set with respect to the grayscale image 21, the identification symbols are labeled with respect to the respective pixels by using any one feature value generation pattern $30_1$ in the respective local areas $21_1, 21_2, 21_3, \ldots, 21_6$, and the number of identification symbols is expressed as the identification symbol frequency distributions $40_1, 40_2, \ldots, 40_6, 41_1, 41_2, \ldots, 41_6, 42_1, 42_2, \ldots, 42_6$. Then, the frequency distributions are aggregated to be expressed as an identification symbol frequency distribution 50 of the converted image. The same process is performed with respect to the remaining feature value generation patterns $30_2, 30_3, \ldots$.

The same process is performed with respect to other converted images, such as the Gaussian filter image 22 and the gradient image 23 for each direction, and the feature values of their converted images are expressed as the identification symbol frequency distributions 51, 52, ... of the converted images. Then, the identification symbol frequency distributions 51, 52, ... of all the converted images are aggregated, and the final identification symbol frequency distribution 60 (feature value) is obtained. Using this aggregated feature value, determination of a person or an object, such as a vehicle and a motorcycle, is performed.

Then, the above-described processes will be described in detail.

Figure 3:
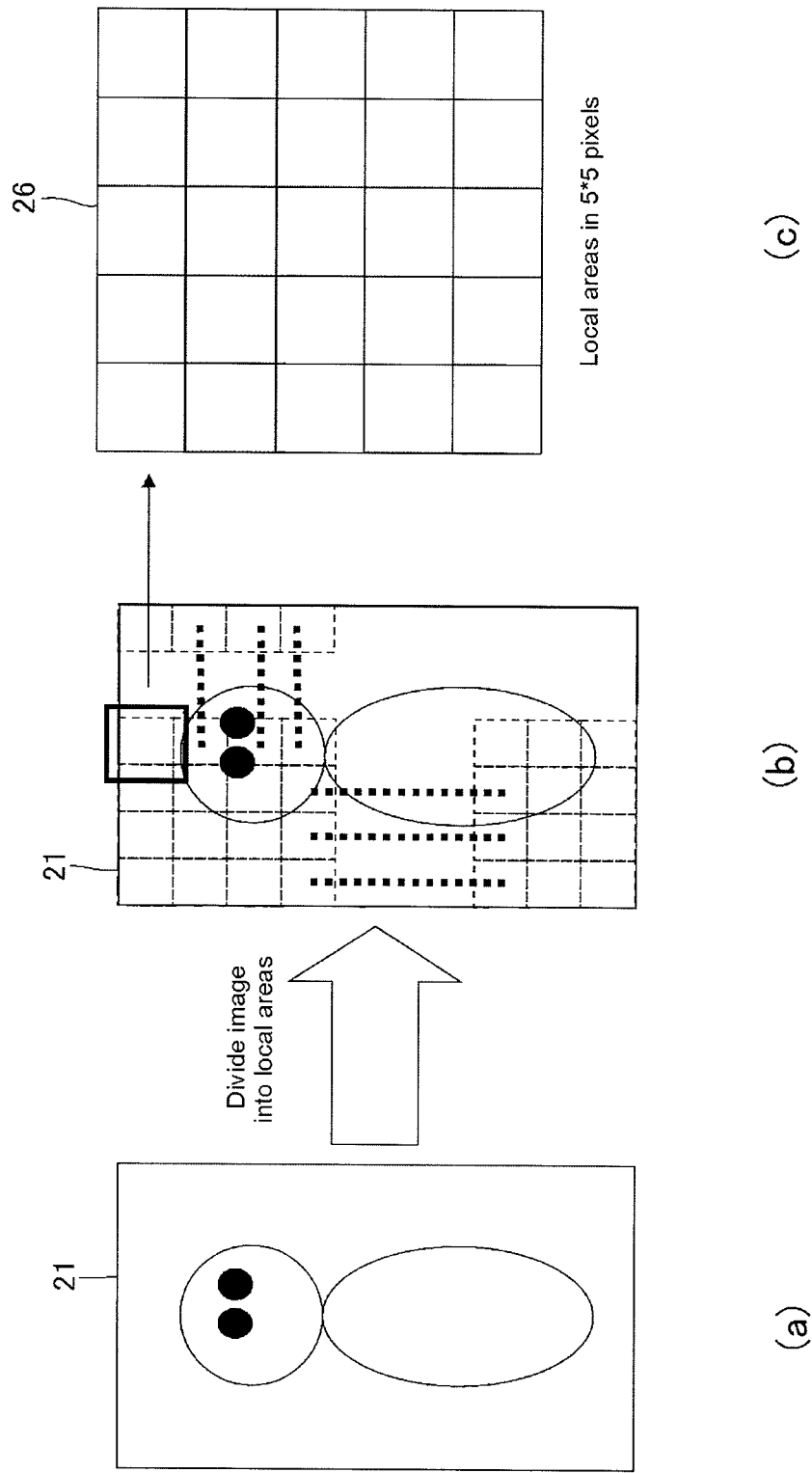
FIGS. 3(a)-(c) are diagrams schematically illustrating a process of dividing a converted image into local areas in the feature value extraction apparatus of FIG. 1.

FIG. 3 is a diagram schematically illustrating a process of dividing a converted image into local areas in the feature value extraction apparatus of FIG. 1. In FIG. 3, (a) is a diagram illustrating a grayscale image 21 that is an example of a converted image. In FIG. 3, (b) is a diagram illustrating a state where the grayscale image 21 is divided into local areas. Further, in FIG. 3, (c) is a diagram illustrating a local area having a size of 5×5 pixels. The size of the converted image, the number of local areas included in the converted image, the size of the local area, and the method of arranging the local areas are not limited to this example. Further, the local areas may not be regularly arranged as shown in (b) of FIG. 3. That is, the local areas having different sizes may be arranged at random positions, or such local areas may be arranged to overlap each other. Hereinafter, the feature value extraction will be described by focusing on the local area of 5×5 pixels.

Figure 4:
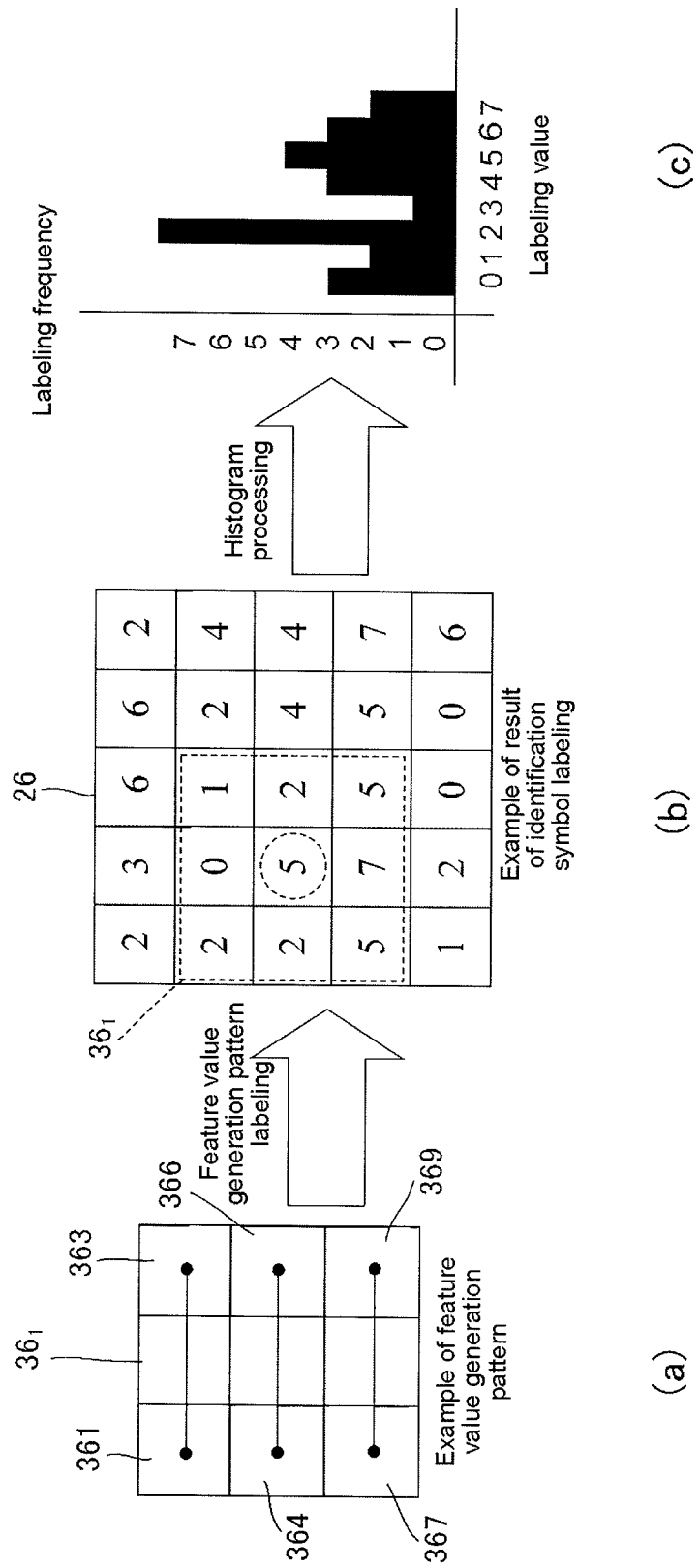
FIGS. 4(a)-(c) are diagrams illustrating an example of identification symbol labeling of pixels in the local area in the feature value extraction apparatus of FIG. 1.

FIG. 4 is a diagram illustrating an example of identification symbol labeling of pixels in the local area in the feature value extraction apparatus of FIG. 1. In FIG. 4, a feature value generation pattern of 3×3 pixels is illustrated as an example. In the case of the feature value generation pattern $36_1$ as shown in (a) of FIG. 4, if comparison of luminance values of three pairs is performed, the number of possible patterns becomes cube of two (since there are three pairs), that is, "8". Accordingly, values of "0" to "7" (identification symbols) can be expressed. In the respective pixels in the local area 26 of 5×5 pixels, a reference position of the feature value generation pattern $36_1$ of 3×3 pixels (in this example, the center position of the feature value generation pattern $36_1$ of 3×3 pixels) is referred to, and the luminance values of three pairs in the horizontal direction (for example, a first pair of the luminance value of a pixel 361 and the luminance value of a pixel 363, a second pair of the luminance value of a pixel 364 and the luminance value of a pixel 366, and a third pair of the luminance value of a pixel 367 and the luminance value of a pixel 369) are compared with each other. Then, the values of the identification symbols "0" to "7" that are calculated from the result of the comparison are labeled to the pixels in the local area corresponding to the reference position of the feature value generation pattern.

As can be seen in (a) of FIG. 4, the feature value generation pattern includes the comparison pairs at the unit positions for performing the comparison between the units in the unit array in which the units, each of which includes at least one pixel, are arranged.

As shown in (b) of FIG. 4, in the case of referring to the feature value generation pattern $36_1$ at a position surrounded by a dotted line with respect to the local area 26, a case where the center value of the feature value generation pattern becomes "5" is described as an example. This value of "5" is calculated through comparison of magnitude relations between the luminance value of the pixel 361 and the luminance value of the pixel 363, between the luminance value of the pixel 364 and the luminance value of the pixel 366, and between the luminance value of the pixel 367 and the luminance value of the pixel 369 of the feature value generation pattern 361. FIG. 5 is a diagram illustrating a method of calculating identification symbol labeling values in the case as shown in FIG. 4. As shown in FIG. 5, magnitudes of the luminance value I(ref) of a remarkable point and the luminance value I(n) in the vicinity thereof are compared with each other, and the result of the comparison is binarized into "1" and "0". In comparing the luminance value "22" of the pixel 361 with the luminance value "8" of the pixel 363 of the feature value generation pattern $36_1$, the luminance value I(ref) "22" of the remarkable point becomes larger than the luminance value I(n) "8" in the vicinity thereof, and the result of comparison becomes "1". Then, in comparing the luminance value "20" of the pixel 364 with the luminance value "31" of the pixel 366 of the feature value generation pattern $36_1$, the luminance value I(ref) "20" of the remarkable point becomes smaller than the luminance value I(n) "31" in the vicinity thereof, and the result of comparison becomes "0". Then, in comparing the luminance value "17" of the pixel 367 with the luminance value "15" of the pixel 369 of the feature value generation pattern $36_1$, the luminance value I(ref) "17" of the remarkable point becomes larger than the luminance value I(n) "15" in the vicinity thereof, and the result of comparison becomes "1". Accordingly, the binary pattern becomes "101", and since "101" becomes "1+4=5", the identification symbol labeling value becomes "5".

As described above, by referring to the feature value generation pattern $36_1$ while changing the reference position thereof in the local area 26, the frequencies of the respective identification symbol labeling values in the feature value generation pattern $36_1$ are obtained. The frequency distribution thereof is as shown in (c) of FIG. 4. In an example shown in (a) to (c) of FIG. 4, the frequency of the identification symbol labeling value "0" is "3", the frequency of the identification symbol labeling value "1" is "2", the frequency of the identification symbol labeling value "2" is "7", the frequency of the identification symbol labeling value "3" is "1", the frequency of the identification symbol labeling value "4" is "3", the frequency of the identification symbol labeling value "5" is "4", the frequency of the identification symbol labeling value "6" is "3", and the frequency of the identification symbol labeling value "7" is "2".

The same process is performed with respect to the remaining feature value generation patterns $36_2$, $36_3$, $36_4$, . . . except for the feature value generation pattern $36_1$.

On the other hand, the method of preparing the feature value generation pattern is not limited to that in the above-described embodiment. Further, there is no limit to the size, such as 3×3, 4×4, 5×5, or the like. Further, several variations may be considered, rather than the comparison of the luminance values of the pixel levels. For example, in order to grasp the detailed features of a person, a vehicle, and motorcycle, it is desirable to use a relatively local feature value generation pattern, such as 3×3 pixels or 4×4 pixels, and in order to grasp a rough shape thereof, it is desirable to use a relatively comprehensive feature value generation pattern, such as 5×5 pixels or 7×7 pixels.

In the case of comparing luminance values of four pairs with respect to the feature value generation pattern, the number of possible patterns becomes the fourth power of two (since there are three pairs), that is, "16" (value of "0" to "15"), and becomes twice in comparison to the case where the luminance values of three pairs are compared.

Figure 6:
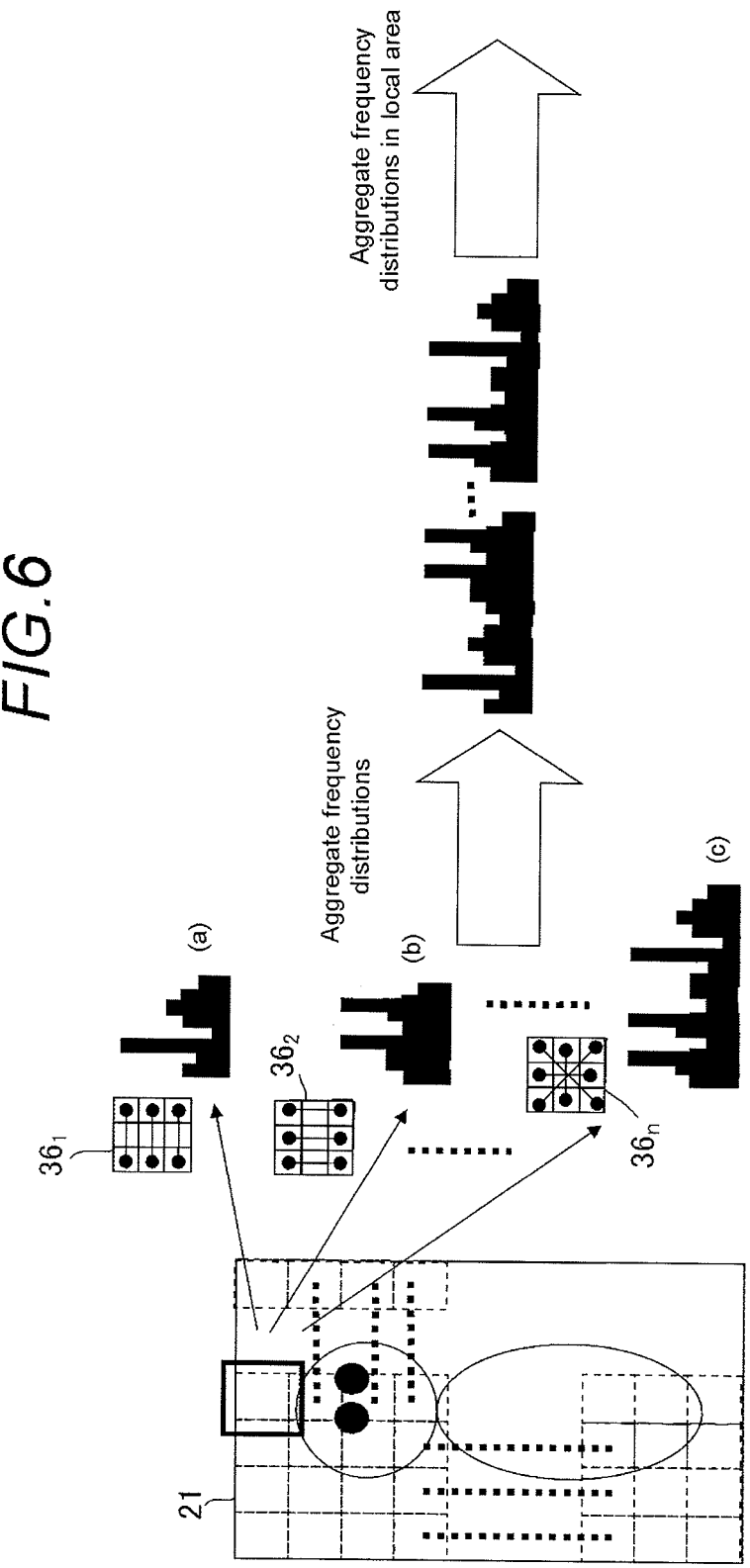
FIG. 6 is a diagram schematically illustrating an example of a case where the frequency distribution of identification symbols is obtained from one local area for different feature value generation patterns in the feature value extraction apparatus of FIG. 1.

The frequency distribution for each feature value generation pattern is obtained from one local area. FIG. 6 is a diagram schematically illustrating an example of a case where the frequency distribution for each feature value generation pattern is obtained from one local area. In FIG. 6, (a) shows the frequency distribution of the identification symbol labeling values obtained by comparison of the luminance values of three pairs in the horizontal direction, (b) shows the frequency distribution of the identification symbol labeling values obtained by comparison of the luminance values of three pairs in the vertical direction, and (c) shows the frequency distribution of the identification symbol labeling values obtained by comparison of the luminance values of four pairs in the vertical, horizontal, and slanting directions. Further, the frequency distributions obtained from one local area are aggregated into one frequency distribution, and this aggregated frequency distribution is called a "local area frequency distribution". Further, all the local area frequency distributions are aggregated into one frequency distribution, and the frequency value of this frequency distribution is called a final "feature value". On the other hand, in aggregating such frequency distributions, the frequency distributions are not simply connected, but the local area having important implications for the detection accuracy of the person or the general object, such as the vehicle or the motorcycle, is pre-stored and processing such as weighting is performed with respect to the frequency distribution corresponding to the local area using a statistical learning method such as boosting or the like.

Although the above-described feature value extraction process is performed for each converted image, the feature value generation pattern handled for each converted image differs from each other. For example, the converted image may be a gradient image for each direction or the average filter image.

Gradient Image for Each Direction

Figure 7:
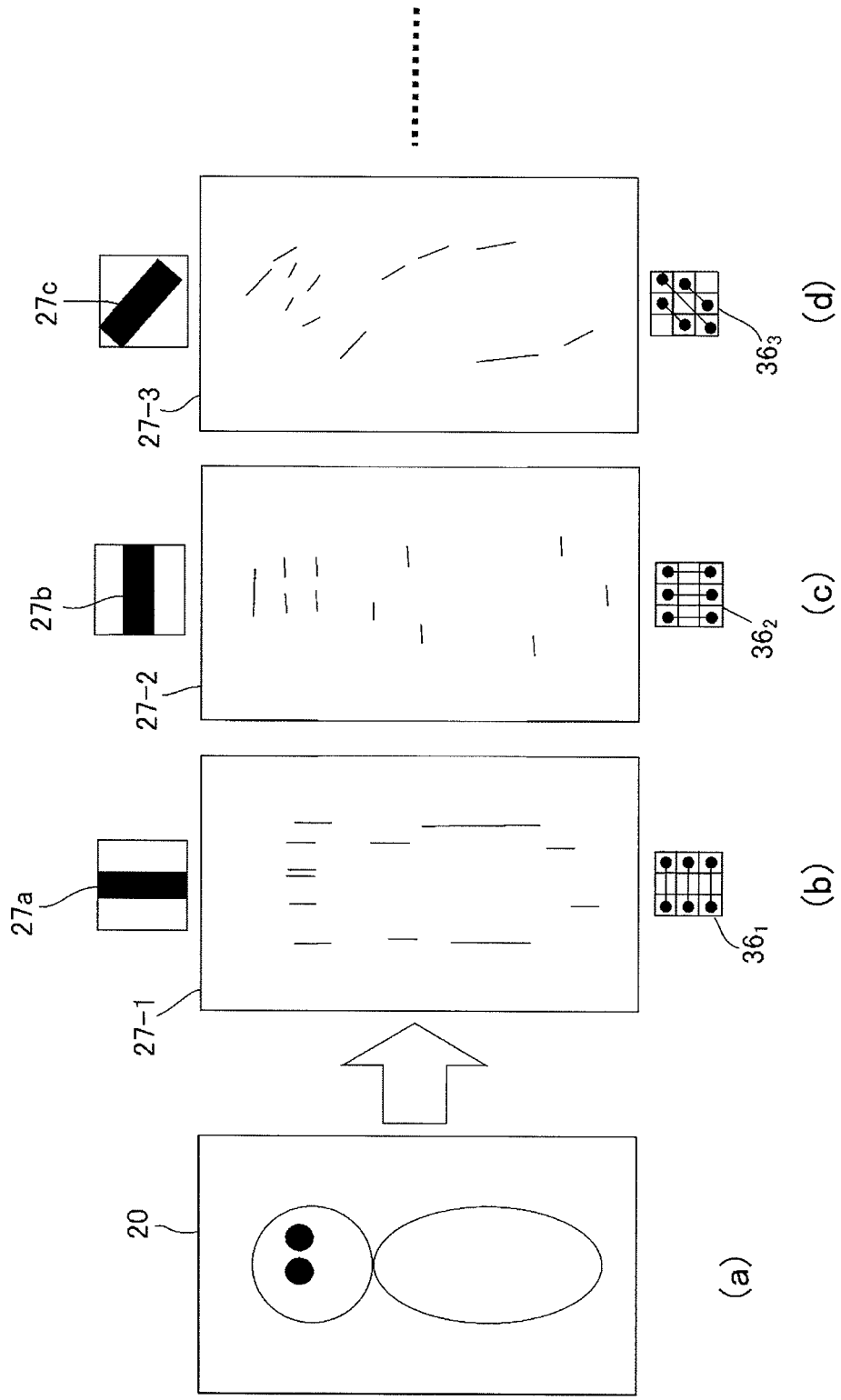
FIGS. 7(a)-(d) are diagrams schematically illustrating the result of converting an input image into a gradient image for each direction in the feature value extraction apparatus of FIG. 1.

FIG. 7 is a diagram schematically illustrating the result of converting the input image into the gradient image. As shown in FIG. 7, if the input image 20 ((a) of FIG. 7) is converted into the gradient images for respective directions, information obtained in the respective converted images 27-1, 27-2, and 27-3 is intentionally limited. That is, by using only the feature value generation pattern that is known in advance it is possible to extract significant information from the respective converted images 27-1, 7-2, and 27-3 (or by not using the waste feature value generation patterns from which significant information is not obtained), the increase of the processing rate through the feature value extraction process, the increase of memory capacity for holding the frequency distributions, the increase of the size of the dictionary unit for determination due to the increase of the number of used feature values, and the deterioration of identification accuracy through performing of the identification process using the waste information can be prevented.

As shown in (b) of FIG. 7, with respect to an edge component 27a in the vertical direction, the feature value generation pattern $36_1$ for comparison in the horizontal direction is used. As shown in (c) of FIG. 7, with respect to an edge component 27b in the horizontal direction, the feature value generation pattern $36_2$ for comparison in the vertical direction is used. As shown in (d) of FIG. 7, with respect to an edge component 27c in the slanting direction, the feature value generation pattern $36_3$ for comparison in the slanting direction is used. As described above, only the feature value generation pattern that is known in advance it is possible to obtain significant information is used.

Average Filter Image

Figure 8:
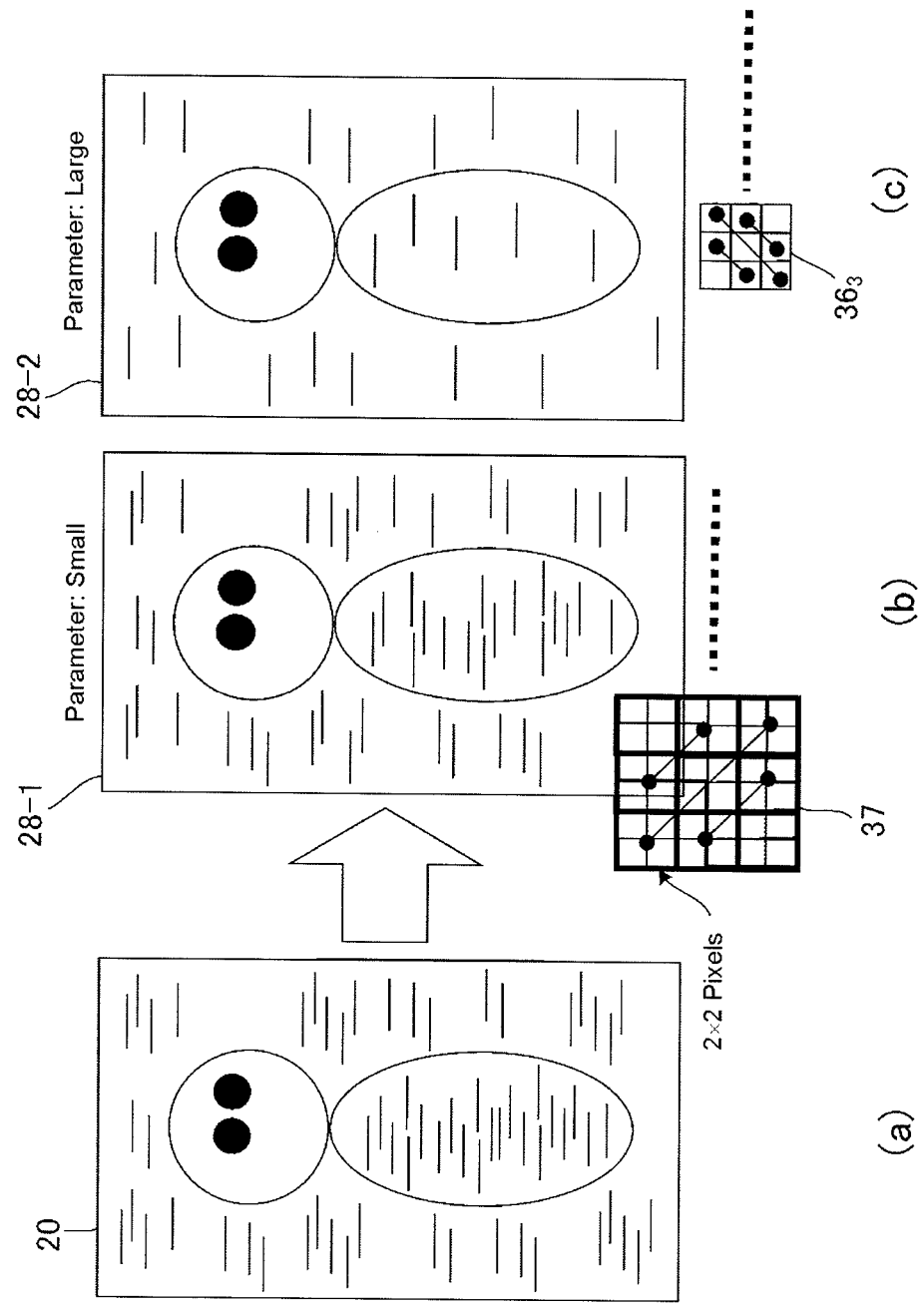
FIGS. 8(a)-(c) are diagrams schematically illustrating the result of converting an input image into an average filter image in the feature value extraction apparatus of FIG. 1.

FIG. 8 is a diagram schematically illustrating the result of converting an input image into an average filter image. As shown in FIG. 8, by converting the input image 20 ((a) of FIG. 8) into the average filter images while changing the filter parameters, images 28-1 and 28-2, of which the removal level of the high-frequency components has been controlled, can be obtained. If many high-frequency components still remain in the input image 20, there is a high possibility that a lot of noise is included in the image 28-1 as shown in (b) of FIG. 8. In this case, for example, it is possible to extract the significant feature value that is subjected to noise by using the pattern 37 for comparing the average luminance values in the 2×2 pixel area having robustness with respect to the noise, rather than using the feature value generation patterns for performing magnitude comparison of the luminance values of the pixel level at which it is possible to extract and discard the insignificant information due to the noise. As shown in (c) of FIG. 8, in the image from which many high-frequency components have been removed, since the noise has already been removed, it is not required to use the pattern for comparing the average luminance values (referred to as "·") in the 2×2 pixel area, but only the feature value generation pattern 363 for comparing the pixel levels in the 3×3 pixel areas is used.

As described above, according to the feature value extraction apparatus 1 according to this embodiment, the converted images 21, 22, 23, ... are generated from one input image 20, and more suitable feature value generation patterns $30_1$, $30_2$, $30_3$, ..., $31_1$, $31_2$, $31_3$, ..., $32_1$, $32_2$, ... are extracted according to the characteristics of the converted images 21, 22, 23, .... In addition, in the local areas $21_1$, $21_2$, $21_3$, ..., $21_8$, $22_1$, $22_2$, $22_3$, $22_8$, $23_1$, $23_2$, $23_3$, ..., $23_8$, which are obtained by dividing the converted images 21, 22, 23, ..., the identification symbol frequency distributions 50, 51, 52, ... of the converted images that correspond to the number of feature value generation patterns are calculated, and the identification symbol frequency distribution 60 that is obtained by aggregating the calculated identification symbol frequency distributions is provided as the final feature value. Accordingly, by using the feature value in the device for detecting the object such as the image determination apparatus, it becomes possible to detect the person or the general object, such as the vehicle or the motorcycle, with high accuracy.

Further, by using only the feature value generation pattern capable of extracting the significant information from the converted images 27-1, 27-2, and 27-3, the increase of the processing rate through the feature value extraction process, the increase of memory capacity for holding the frequency distributions, the increase of the size of the dictionary unit for determination due to the increase of the number of used feature values, and the deterioration of identification accuracy through performing of the identification process using the waste information can be prevented.

On the other hand, the variation of the converted image generation unit 3 of the feature value extraction apparatus 1 according to this embodiment will be described below.

(a) Variation of the Converted Image Generation Unit 3

Generally considered image conversion method can be used for, such as a color image (RGB channels and YCbCr channels), a grayscale image, a gradient image for each direction, an N×M average filter image (where, N and M are real numbers), an optical flow image, a differential/average image between N frames (where, N is a real number), a distance image, a frequency image, DOG (Difference of Gaussian) image, and the like.

(b) Feature Value Between the Converted Images

Figure 9:
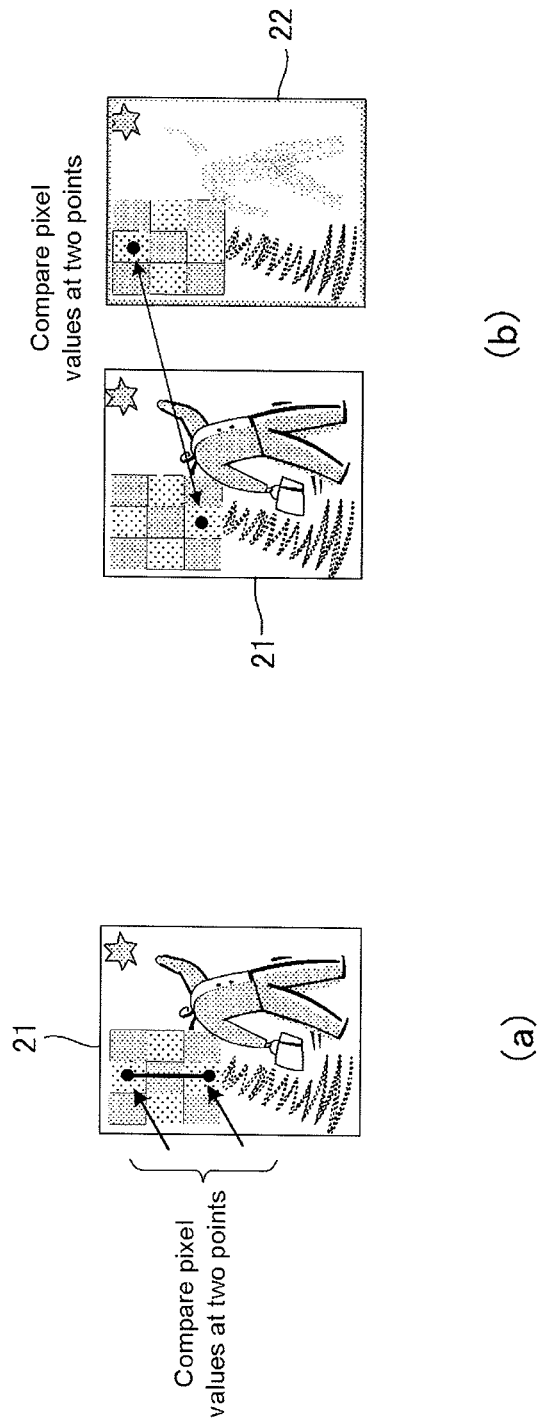
FIGS. 9(a)-(c) are diagrams illustrating a feature value between converted images as an application example of the feature value extraction apparatus of FIG. 1.

Rather than extracting binary pattern feature values in a single converted image in the related art, binary pattern feature values over one or more converted images are extracted. For example, rather than comparing the luminance values at two points in the grayscale image 21 as shown in (a) of FIG. 9, the luminance value at one point in the grayscale image 21 and the luminance value at one point in the Gaussian filter image 22 are compared with each other as shown in (b) of FIG. 9.

(c) Application to Detection of a Vehicle, a Motorcycle, and the Like

It is possible to detect a general object such as a vehicle or a motorcycle in addition to a person. Depending on an object to be detected, such as a person, a vehicle, or a motorcycle, the converted images being used or feature value generation patterns may be changed.

Further, as a hardware configuration of the feature value extraction apparatus 1 according to the embodiment of the present invention, a typical computer may be used. That is, the feature value extraction apparatus 1 may be configured by a computer provided with a volatile memory such as a CPU and a RAM, a nonvolatile memory such as a ROM, and a mass storage device such as a hard disc or an SSD (Solid State Drive).

Further, it is also possible to store and distribute a program describing the process in the feature value extraction apparatus 1 according to the embodiment of the present invention using a storage medium such as a magnetic disk, an optical disk, a magneto-optic disk, a semiconductor memory, and the like, or to distribute the program using an electrical communication line such as the Internet.

Figure 10:
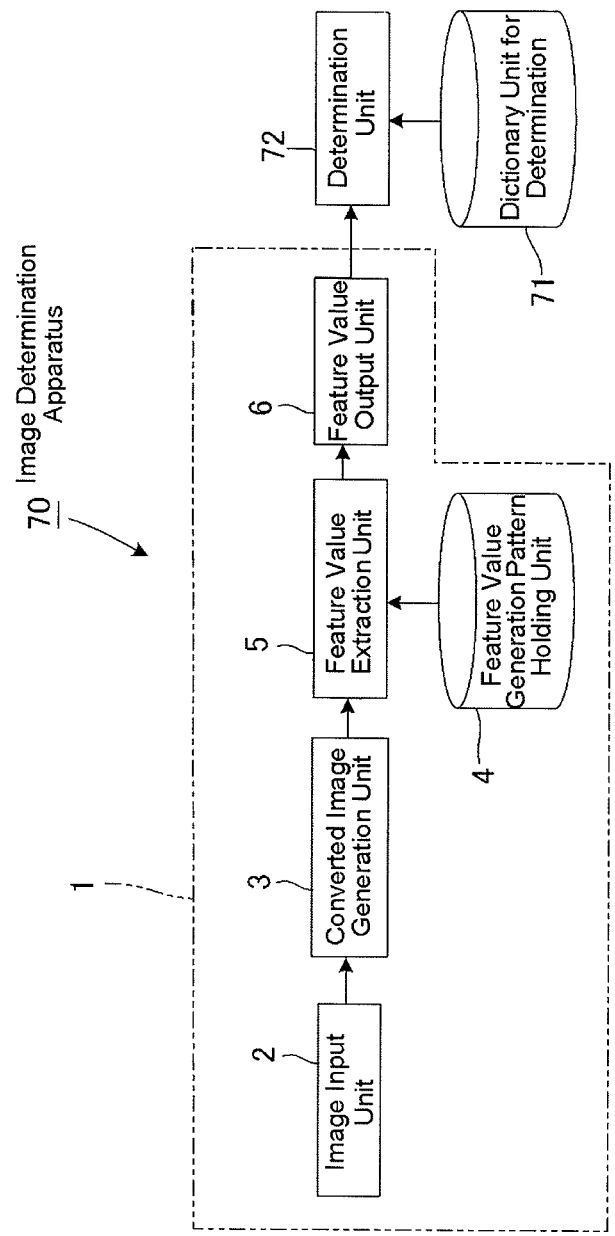
FIG. 10 is a block diagram illustrating the schematic configuration of an image determination apparatus using the feature value extraction apparatus of FIG. 1.

Further, the image determination apparatus can be realized using the feature value extraction apparatus 1 according to the embodiment of the present invention. FIG. 10 is a block diagram illustrating the schematic configuration of an image determination apparatus 70 using the feature value extraction apparatus 1. The image determination unit 70 includes a feature value extraction apparatus 1, a dictionary unit (feature value holding means) 72 for determination, and a determination unit 72. The dictionary unit 71 for determination holds the feature values that the object to be determined for determining the image has. The determination unit 72 determines whether the object to be determined is included in the input image. Since the image determination apparatus 70 includes the feature value extraction apparatus 1, it is possible to detect a person and a general object such as a vehicle or a motorcycle with high accuracy.

The present application is based upon and claims the benefit of Japanese patent application No. 2011-167232 filed on Jul. 29, 2011, the contents of which are incorporated by reference in its entirety.

INDUSTRIAL APPLICABILITY

According to the present invention, not only a person but also a general object, such as a vehicle or a motorcycle, can be detected with high accuracy, and a small amount of processing and memory usage can be kept through the feature value extraction. The present invention can be applied to an object detection device for detecting an object from image information.

REFERENCE SIGNS LIST

1: feature value extraction apparatus
2: image input unit
3: converted image generation unit
4: feature value generation pattern holding unit
5: feature value extraction unit
6: feature value output unit
20: input image
21: grayscale image
22: Gaussian filter image
23: gradient image for each direction
$21_1, 21_2, 21_3, \ldots, 21_6, 22_1, 22_2, 22_3, \ldots, 22_6, 23_1, 23_2, 23_3, \ldots, 23_6$: local area
26: local area
27-1, 27-2, 27-3: converted image
27a: edge component in vertical direction
27b: edge component in horizontal direction
27c: edge component in slanting direction
28-1, 28-2: image
$30_1, 30_2, 30_3, \ldots, 31_1, 31_2, 31_3, \ldots, 32_1, 32_2, \ldots$: feature value generation pattern
$36_1, 36_2, 36_3, 36_n$: feature value generation pattern
$40_1, 40_2, \ldots, 40_8, 41_1, 41_2, \ldots, 41_8, 42_1, 42_2, \ldots, 42_8$: identification symbol frequency distribution in local area
50, 51, 52: identification symbol frequency distribution of converted image
60: identification symbol frequency distribution
70: image determination apparatus
71: dictionary unit for determination
72: determination unit
361, 363, 364, 366, 367, 369: pixel

The invention claimed is:

1. A feature value extraction apparatus, comprising:
a processor;
a memory;
an image receiver that receives an input of an image;
a converted image generator that converts the input image into a plurality of converted images for extracting a feature value of the input image;
a feature value generation pattern holding storage that stores a feature value generation pattern that includes a plurality of comparison pairs of unit positions for comparing unit values in a unit array in which units, each of which includes at least one pixel, are arranged; and
a feature value extractor that compares the unit values corresponding to the comparison pairs through referring to the feature value generation pattern with respect to each of the plurality of converted images, and extracts the feature value for each of the plurality of converted images,
wherein the feature values for the plurality of converted images are connected with each other to obtain the feature value of the input image.

2. The feature value extraction apparatus according to claim 1,
wherein the unit values are obtained from luminance values of the pixels of the units.

3. The feature value extraction apparatus according to claim 1,
wherein the plurality of comparison pairs constituting the feature value generation pattern are distinguished by predetermined identification symbols for each of the comparison pairs, and
the feature value extractor refers to the feature value generation patterns multiple times while changing a reference position of the feature value generation pattern for each of the plurality of converted images, and extracts the feature value for each of the plurality of converted images by frequency distributions of the predetermined identification symbols.

4. The feature value extraction apparatus according to claim 3,
wherein at least one of the plurality of converted images is divided into a plurality of local areas, and the feature value unit obtains the feature value for the at least one of the plurality of converted images from the frequency distribution obtained for each of the local areas.

5. The feature value extraction apparatus according to claim 3,
wherein each of the plurality of converted images is divided into a plurality of local areas, and the feature value extractor obtains an aggregate feature value by collecting, for each of the plurality of converted images, the frequency distributions obtained for each of the local areas, and obtains the feature value of the input image from the aggregated feature values for the converted images.

6. An image determination apparatus, comprising:
a feature value holding storage that holds a feature value that an object to be determined for determining an image has; and
the feature value extraction apparatus as defined in claim 1,
wherein the image determination apparatus determines whether the object to be determined is included in the input image.

7. A feature value extraction method, comprising:

receiving an input of an image;

converting the input image into a plurality of converted images for extracting a feature value of the input image;

storing a feature value generation pattern that includes a plurality of comparison pairs of unit positions for comparing unit values in a unit array in which units, each of which includes at least one pixel, are arranged;

comparing the unit values corresponding to the comparison pairs through referring to the feature value generation pattern with respect to each of the plurality of converted images, and extracting the feature value for each of the plurality of converted images; and obtaining the feature value of the input image by connecting the feature values for the plurality of converted images with each other.

8. An image determination method, comprising:

holding a feature value that an object to be determined for determining an image has; and determining whether the object to be determined is included in the input image by using the feature value extraction method as defined in claim 7.

* * * * *